| (12) | United States Patent | (10) Patent No.: | US 10,766,307 B2 |
|---|---|---|---|
| | Vilcot et al. | (45) Date of Patent: | Sep. 8, 2020 |

(54) TIRE-TYPE DEVICE FOR A VEHICLE

(71) Applicant: COMPAGNIE GENERALE DES ETABLISSEMENTS MICHELIN, Clermont-Ferrand (FR)

(72) Inventors: Florian Vilcot, Clermont-Ferrand (FR); Sébastien Rigo, Clermont-Ferrand (FR); Daniel Beaulaton, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 361 days.

(21) Appl. No.: 15/741,386

(22) PCT Filed: Jul. 5, 2016

(86) PCT No.: PCT/EP2016/065760
§ 371 (c)(1),
(2) Date: Jan. 2, 2018

(87) PCT Pub. No.: WO2017/005713
PCT Pub. Date: Jan. 12, 2017

(65) Prior Publication Data
US 2018/0194169 A1  Jul. 12, 2018

(30) Foreign Application Priority Data

Jul. 6, 2015 (FR) ...................... 15 56380

(51) Int. Cl.
*B60C 7/14* (2006.01)
*B60C 7/12* (2006.01)

(52) U.S. Cl.
CPC ............... *B60C 7/14* (2013.01); *B60C 7/125* (2013.01); *B60C 2007/146* (2013.01)

(58) Field of Classification Search
CPC .................. B60C 7/14; B60C 2007/146
See application file for complete search history.

(56) References Cited

U.S. PATENT DOCUMENTS

| 4,235,270 A | 11/1980 | Kahaner et al. |
|---|---|---|
| 2003/0121581 A1 | 7/2003 | Thompson et al. |

(Continued)

FOREIGN PATENT DOCUMENTS

| FR | 2 921 011 | 3/2009 |
|---|---|---|
| WO | WO 02/083435 | 10/2002 |

(Continued)

*Primary Examiner* — Timothy Kennedy
*Assistant Examiner* — Alexander A Wang
(74) *Attorney, Agent, or Firm* — Cozen O'Connor

(57) ABSTRACT

Bearing structure (6) has identical bearing elements (61) in tension outside contact patch (A) with the ground and in compression in the contact patch (A). Bearing elements (61) are filamentary and are connected to radially inner face (23) of radially outer structure of revolution (2) by radially outer fabric (71) and to radially outer face (33) of radially inner structure of revolution (3) by radially inner fabric (72), respectively. Furthermore, mean surface density D of bearing elements (61) per unit area of radially outer structure of revolution (2), expressed in $1/m^2$, is at least equal to $(S/S_E)*Z/(A*F_r)$, where S is area, in $m^2$, of radially inner face (23) of radially outer structure of revolution (2), $S_E$ is connecting area, in $m^2$, of radially outer fabric (71) with radially inner face (23) of radially outer structure of revolution (2), Z is nominal radial load, in N, A is area of contact with the ground, in $m^2$, and $F_r$ is the force at break, in N, of bearing element (61).

20 Claims, 7 Drawing Sheets

(56) References Cited

U.S. PATENT DOCUMENTS

2004/0012246 A1    1/2004   Rhyne et al.
2010/0260967 A1   10/2010   Delfino et al.
2012/0318417 A1*  12/2012   Dotson .................... B60C 7/10
                                                    152/17

FOREIGN PATENT DOCUMENTS

WO    WO 2005/007422    1/2005
WO    WO 2009/087291    7/2009

\* cited by examiner

TIRE-TYPE DEVICE FOR A VEHICLE

RELATED APPLICATIONS

This is a U.S. National Phase Application under 35 USC 371 of International Application PCT/EP2016/065760 filed on Jul. 5, 2016.

This application claims the priority of French application no. 1556380 filed Jul. 6, 2015, the entire content of which is hereby incorporated by reference.

FIELD OF THE INVENTION

The present invention relates to a tire-type device intended to equip a vehicle. This tire-type device is designed preferably for passenger vehicles but can be used on any other type of vehicle, such as two-wheeled vehicles, heavy-duty vehicles, agricultural vehicles, construction plant vehicles or aircraft or, more generally, on any rolling device.

BACKGROUND OF THE INVENTION

A conventional tire is a torus-shaped structure that is intended to be mounted on a rim, pressurized by an inflation gas and squashed down onto the ground under the action of a load. At any point on its tread surface, which is intended to come into contact with the ground, the tire has a double curvature: a circumferential curvature and a meridian curvature. Circumferential curvature means a curvature in a circumferential plane, defined by a circumferential direction, tangent to the tread surface of the tire in the rolling direction of the tire, and a radial direction, perpendicular to the axis of rotation of the tire. Meridian curvature means a curvature in a meridian or radial plane, defined by an axial direction, parallel to the axis of rotation of the tire, and a radial direction, perpendicular to the axis of rotation of the tire.

In the following text, the expression "radially inner or, respectively, radially outer" means "closer to or, respectively, further away from the axis of rotation of the tire". The expression "axially inner or, respectively, axially outer" means "closer to or, respectively, further away from the equatorial plane of the tire", the equatorial plane of the tire being the plane that passes through the middle of the tread surface of the tire and is perpendicular to the axis of rotation of the tire.

It is known that the flattening of the tire on horizontal ground, in a circumferential plane and in a meridian plane, is conditioned by the values of the circumferential and meridian radii of curvature, respectively, at the points of the tread surface that are positioned at the limits of the contact patch in which the tire is in contact with the ground. This flattening is all the easier the larger these radii of curvature are, that is to say when the curvatures are low, since the curvature at any one point, in the mathematical sense, is the inverse of the radius of curvature. It is also known that the flattening of the tire has an impact on the performance of the tire, in particular rolling resistance, grip, wear and noise.

Consequently, those skilled in the art, tire specialists, seeking to obtain a good compromise between the expected performance of the tire, such as wear, grip, endurance, rolling resistance and noise, this list not being exhaustive, have developed alternative solutions to conventional tires in order to optimize the flattening thereof.

A conventional prior art tire generally has a high meridian curvature, that is to say a small meridian radius of curvature, at the axial ends of the tread, known as shoulders, when the tire, mounted on its mounting rim and inflated to its recommended use pressure, is subjected to its service load. The mounting rim, the use pressure and the service load are defined by standards, such as the standards of the European Tire and Rim Technical Organisation (ETRTO), for example. A conventional tire bears the load applied, substantially by the axial ends of the tread, or shoulders, and by the sidewalls connecting the tread to beads that ensure the mechanical connection of the tire to its mounting rim. It is known that meridian flattening of a conventional tire, with a low meridian curvature at the shoulders, is generally difficult to obtain.

The document U.S. Pat. No. 4,235,270 describes a tire having an annular body made of elastomeric material, comprising a radially outer cylindrical part, at the periphery of the tire, that can comprise a tread, and a radially inner cylindrical part that is intended to be mounted on a rim. A plurality of walls that are spaced apart in the circumferential direction extend from the radially inner cylindrical part to the radially outer cylindrical part and bear the load. Moreover, sidewalls can connect the radially inner cylindrical part and the radially outer cylindrical part in order to form, in association with the tread and the sidewalls, a closed cavity and thereby to allow the tire to be pressurized. However, such a tire has a high mass compared with a conventional tire and, on account of its massive nature, is likely to dissipate a large amount of energy, which can limit its endurance and thus its useful life.

The document WO 2009087291 describes a tire structure comprising an internal, or radially inner, annular shell and an external, or radially outer, annular shell that are connected by two sidewalls and by a bearing structure. According to that invention, the bearing structure is pressurized and divides the annular volume of the tire into a plurality of compartments or cells, and the sidewalls are connected to or integrated with the bearing structure. In that case, the load applied is borne both by the bearing structure and the sidewalls. The distribution of pressure in the contact patch is not homogeneous across the axial width of the contact patch, with raised pressures at the shoulders on account of the difficulty of meridian flattening because of the connection between the sidewalls and the bearing structure. These raised pressures at the shoulders are likely to generate significant wear at the shoulders of the tread.

The document WO 2005007422 describes a compliant wheel comprising a compliant band and a plurality of spokes extending radially inwards from the compliant band to a hub. The compliant band is intended to adapt to the area of contact with the ground and to envelop obstacles. The spokes transmit the load borne between the compliant band and the hub, by virtue of the spokes that are not in contact with the ground being tensioned. Such a compliant wheel requires optimization of the distribution of the spokes so as to ensure a substantially cylindrical periphery. Moreover, a compliant wheel has a relatively high mass compared with a conventional tire.

SUMMARY OF THE INVENTION

One object of the present invention is to provide a tire-type device having improved flattening of its tread when it is subjected to a load.

This objective has been achieved according to one aspect of the invention by a tire-type device intended to equip a vehicle, comprising:

a radially outer structure of revolution, the axis of revolution of which is the axis of rotation of the tire-type device and which is intended to come into contact with the ground via a tread comprising at least one elastomeric material, the radially outer structure of revolution having two axial ends and a radially inner face having an area S, and the radially outer structure of revolution comprising a circumferential reinforcement, a radially inner structure of revolution that is coaxial with the radially outer structure of revolution and is intended to ensure the connection of the tire-type device with a means for mounting on the vehicle, the radially inner structure of revolution having two axial ends and a radially outer face, and the radially inner structure of revolution comprising at least one polymeric material, an inner annular space of mean radial height H that is radially delimited by the radially inner face of the radially outer structure of revolution and by the radially outer face of the radially inner structure of revolution, a bearing structure made up of a plurality of identical bearing elements that are independent in pairs in the inner annular space, the bearing elements extending continuously from the radially inner face of the radially outer structure of revolution to the radially outer face of the radially inner structure of revolution, such that, when the tire-type device is subjected to a nominal radial load Z and is in contact with flat ground via an area of contact A, the bearing elements that are connected to that portion of the radially outer structure of revolution that is in contact with the ground are made to buckle under compression and at least some of the bearing elements that are connected to that portion of the radially outer structure of revolution that is not in contact with the ground are under tension, the bearing elements of the bearing structure being filamentary, the bearing elements of the bearing structure being connected to the radially inner face of the radially outer structure of revolution by a radially outer fabric, at least partially covering said radially inner face over a connecting area $S_E$, and being connected to the radially outer face of the radially inner structure of revolution by a radially inner fabric, at least partially covering said radially outer face, the assembly made up of the bearing structure, the radially outer fabric and the radially inner fabric being a sandwich structure, the mean surface density D of the bearing elements per unit area of radially outer structure of revolution, expressed in $1/m^2$, being at least equal to $(S/S_E)*Z/(A*F_r)$, where S is the area, in $m^2$, of the radially inner face of the radially outer structure of revolution, $S_E$ is the connecting area, in $m^2$, of the radially outer fabric with the radially inner face of the radially outer structure of revolution, Z is the nominal radial load, in N, applied to the tire-type device, A is the area of contact with the ground, in $m^2$, of the tire-type device, and $F_r$ is the force at break, in N, of a bearing element.

the tire-type device comprising two sidewalls that connect, in pairs, the axial ends of the radially outer and radially inner structures of revolution, respectively, and axially delimiting the inner annular space, such that the inner annular space forms a closed cavity that can be pressurized by an inflation gas.

A tire-type device according to an embodiment of the invention comprises essentially a radially outer structure of revolution and a radially inner structure of revolution, which are separated by an inner annular space and connected by a bearing structure.

The tire-type device according to an embodiment of the invention has a bearing structure which is made up of identical bearing elements that are independent in pairs in the inner annular space and is able to bear the load applied to the tire-type device by the tensioning of some of the bearing elements positioned outside the contact patch, the bearing elements positioned in the contact patch being made to buckle under compression and therefore not contributing towards bearing the load applied.

The bearing structure is made up of a plurality of identical bearing elements, that is to say ones which have identical geometrical features and are made of identical materials.

The bearing elements are independent in pairs in the inner annular space, that is to say are not mechanically connected together in the inner annular space, such that they have different mechanical behaviours. For example, they are not connected together so as to form a network or a lattice.

Each bearing element extends continuously from the radially inner face of the radially outer structure of revolution to the radially outer face of the radially inner structure of revolution, that is to say along a trajectory that comprises a first end connected to the radially inner face of the radially outer structure of revolution and a second end connected to the radially outer face of the radially inner structure of revolution.

According to a first feature, the bearing elements of the bearing structure are filamentary, that is to say one-dimensional elements similar to threads.

Each bearing element can be characterized geometrically by its length $L_P$ and by its mean section $S_P$, which is the average of the sections obtained by cutting the bearing element through all the cylindrical surfaces which are coaxial with the radially outer structure of revolution and the radially inner structure of revolution and are comprised radially between said two structures of revolution. In the most frequent case of a constant section of the bearing element, the mean section $S_P$ is equal to this constant section.

The mean section $S_P$ of the bearing element comprises a largest characteristic dimension L and a smallest characteristic dimension E, the ratio K=L/E of which is known as the aspect ratio. By way of examples, a circular mean section $S_P$, having a diameter equal to d, has an aspect ratio K=1, a rectangular mean section $S_P$, having a length L and a width l, has an aspect ratio K=L/l, and an elliptical mean section $S_P$, having a major axis A and a minor axis a, has an aspect ratio K=A/a.

By definition, a bearing element is referred to as filamentary or one-dimensional when the smallest characteristic dimension E of its mean section $S_P$ is at most equal to 0.02 times the mean radial height H of the inner annular space and when the aspect ratio K of its mean section $S_P$ is at most equal to 3.

A smallest characteristic dimension E of the mean section $S_P$ of the bearing element at most equal to 0.02 times the mean radial height H of the inner annular space rules out any massive bearing element having a large volume. In other words, each bearing element has high slenderness in the radial direction, allowing it to buckle on passing through the contact patch. Outside the contact patch, each bearing element returns to its initial geometry, since the buckling thereof is reversible. Such a bearing element has good fatigue strength.

An aspect ratio K of its mean section $S_P$ at most equal to 3 means that the largest characteristic dimension L of its mean section $S_P$ is at most equal to 3 times the smallest characteristic dimension E of its mean section $S_P$.

A filamentary bearing element has mechanical behaviour of the filamentary type, that is to say that it can only be subjected to tensile or compression forces along its mean line. Among components that are commonly used in the field of tires, textile reinforcers, made up of an assembly of spun textile filaments, or metal cords, made up of an assembly of metal threads, can be considered filamentary bearing elements, since, their mean section $S_P$ being substantially circular, the aspect ratio K is equal to 1, and thus less than 3.

It should be noted that not all the filamentary bearing elements of a bearing structure necessarily have identical lengths $L_P$.

According to a second feature, the bearing elements of the bearing structure are connected to the radially inner face of the radially outer structure of revolution by a radially outer fabric, at least partially covering said radially inner face over a connecting area $S_E$, and are connected to the radially outer face of the radially inner structure of revolution by a radially inner fabric, at least partially covering said radially outer face, the assembly made up of the bearing structure, the radially outer fabric and the radially inner fabric being a sandwich structure. Thus, a radially outer fabric and a radially inner fabric serve as interfaces between the bearing elements and the radially outer and radially inner structures of revolution, respectively, which are therefore not in direct contact. The term "fabric" is understood to mean a structure obtained by weaving elementary threads that can be made up of various types of material. It should be noted that the connecting area $S_E$ of the radially outer fabric with the radially outer face of the radially inner structure of revolution is not necessarily identical to the area S of the radially outer face of the radially inner structure of revolution. The radially outer fabric does not have to be continuous and may consist of juxtaposed fabric elements: in this case, the connecting area $S_E$ of the radially outer fabric with the radially outer face of the radially inner structure of revolution is the total of the connecting areas of the juxtaposed fabric elements. In practice, the connecting area $S_E$ is at most equal to the area S, that is to say that the radially outer fabric does not necessarily cover the entirety of the radially inner face of the radially outer structure of revolution. Similarly, the connecting area $S_I$ of the radially inner fabric with the radially outer face of the radially inner structure of revolution is at most equal to the area S' of the radially outer face of the radially inner structure of revolution, that is to say that the radially inner fabric does not necessarily cover the entirety of the radially outer face of the radially inner structure of revolution. As is the case for the radially outer fabric, the radially inner fabric does not have to be continuous and may consist of juxtaposed fabric elements: in this case, the connecting area $S_I$ of the radially inner fabric with the radially outer face of the radially inner structure of revolution is the total of the connecting areas of the juxtaposed fabric elements.

This design makes it possible advantageously to have a sandwich structure that can be manufactured independently and integrated in one piece during the building of the tire-type device. The sandwich structure thus obtained can be secured to the radially outer and radially inner structures of revolution, respectively, by vulcanization, adhesive bonding or any other method for connecting the radially outer and radially inner fabrics, respectively.

According to a third feature, the mean surface density D of the bearing elements per unit area of radially outer structure of revolution, expressed in $1/m^2$, is at least equal to $(S/S_E)*Z/(A*F_r)$, where S is the area, in $m^2$, of the radially inner face of the radially outer structure of revolution, $S_E$ is the connecting area, in $m^2$, of the radially outer fabric with the radially inner face of the radially outer structure of revolution, Z is the nominal radial load, in N, applied to the tire-type device, A is the area of contact with the ground, in $m^2$, of the tire-type device, and $F_r$ is the force at break, in N, of a bearing element.

The nominal radial load Z is the recommended load for use of the tire-type device. The area of contact A with the ground is the area over which the tire-type device is squashed on the ground under the action of the nominal radial load Z.

This expression reflects, in particular, the fact that the mean surface density D of the bearing elements per unit area of radially outer structure of revolution is higher, the higher the nominal radial load Z and/or the lower the area ratio $S_E/S$, representing the degree of coverage of the radially inner face of the radially outer structure of revolution by the radially outer fabric. The mean surface density D of the bearing elements is lower, the greater the force at break under tension $F_r$ of a bearing element.

Such a mean surface density D of the bearing elements makes it possible for the bearing elements in tension outside the contact patch to bear the nominal radial load Z and also for the bearing elements in compression in the contact patch to ensure flattening of the tread, both in a circumferential plane and in a meridian plane, that is improved compared with conventional tires and other tire-type devices known from the prior art.

Generally, the surface density of the bearing elements is constant both in the circumferential direction and in the axial direction, that is to say that the distribution of the bearing elements is uniform both circumferentially and axially: the mean surface density D is thus equal to the constant surface density. The advantage of a constant surface density is that it helps to give the tread a quasi-cylindrical geometry, with a reduced "rippling" effect, as it is known, compared with other tire-type devices from the prior art.

However, the surface density of the bearing elements may be variable in the circumferential direction and/or in the axial direction, that is to say that the distribution of the bearing elements is not necessarily uniform circumferentially and/or axially, whence the introduction of the feature of mean surface density D.

According to a fourth feature, the tire-type device of the invention comprises two sidewalls that connect the axial ends of the radially outer and radially inner structures of revolution, respectively, and axially delimit the inner annular space, such that the inner annular space forms a closed cavity that can be pressurized by an inflation gas.

The sidewalls can, depending on their design and, in particular, on their structural stiffness, contribute to a greater or lesser extent towards bearing the load applied. The sidewalls generally comprise at least one elastomeric material and can optionally comprise a reinforcement. The sidewalls may or may not be connected directly to the bearing structure. When they are not connected directly to the bearing structure, the sidewalls have an autonomous mechanical behaviour, without having an effect on the mechanical operation inherent to the bearing structure. Moreover, in combination with the radially outer structure of revolution and the radially inner structure of revolution, they close the inner annular space which then forms a closed cavity that can be pressurized or not pressurized by an inflation gas. In the case of effective pressurization by an inflation gas, the tire-type device then has a tire stiffness, due to the pressure, which will also contribute towards bearing the load applied. Usually, for use on a passenger vehicle, the pressure is at least equal to 0.5 bar, preferably at least equal to 1 bar. The higher the pressure, the more the tire stiffness contributes towards bearing the load applied, and, therefore, the less the structural stiffness of the bearing structure and/or of the sidewalls and/or of the radially outer and radially inner structures of revolution, respectively, contributes towards bearing the load applied. In the absence of pressurization and in the case of low structural stiffness of the sidewalls, the bearing structure and the radially outer and radially inner structures of revolution, respectively, bear all of the load, the sidewalls only having a protective role with respect to possible attack by elements outside the tire-type device.

The combination of these features allows improved flattening of the tread, in particular in a meridian plane, by an increase in the meridian radii of curvature at the axial ends of the tread.

This results, in particular, in homogenization of the pressures in the contact patch in contact with the ground, this helping to increase the useful life in terms of wear and grip of the tire-type device.

The combination of these features also allows an increase in the natural vibration frequencies of the tire-type device, this helping to improve the comfort in terms of vibration and noise of the tire-type device.

Finally, the rolling resistance of such a tire-type device is substantially reduced, this being favourable for lowering the fuel consumption of the vehicle.

The surface density D of the bearing elements per unit area of radially outer structure of revolution, expressed in $1/m^2$, is advantageously at least equal to $3*(S/S_E)*Z/(A*F_r)$. A higher surface density of bearing elements improves the homogenization of the pressures in the contact patch in contact with the ground and ensures a higher safety coefficient with respect to the load applied and with respect to endurance.

The surface density D of the bearing elements per unit area of radially outer structure of revolution, expressed in $1/m^2$, is even more advantageously at least equal to $6*(S/S_E)*Z/(A*F_r)$. An even higher surface density of bearing elements improves even further the homogenization of the pressures in the contact patch in contact with the ground and makes it possible to further increase the safety coefficient with respect to the load applied and with respect to endurance.

The mean surface density D of the bearing elements per unit area of radially outer structure of revolution, expressed in $1/m^2$, is advantageously at least equal to 5000.

Advantageously, the connecting area $S_E$ of the radially outer fabric with the radially inner face of the radially outer structure of revolution is equal to the area S of the radially inner face of the radially outer structure of revolution, that is to say that the radially outer fabric covers the entirety of the radially inner face of the radially outer structure of revolution. Under these conditions, the minimum mean surface density D of the bearing elements is equal to $Z/(A*F_r)$.

According to a preferred embodiment of the radially outer fabric, the radially outer fabric is a woven fabric comprising interlacings of a first family of threads that are mutually parallel and form, with a circumferential direction XX' of the tire-type device, an angle $A_E$ at least equal to 10° and at most equal to 45°, and of a second family of threads that are mutually parallel, the respective threads of the two families of threads being symmetrical with respect to an equatorial plane XZ of the tire-type device.

According to a preferred embodiment of the radially inner fabric, the radially inner fabric is a woven fabric comprising interlacings of a first family of threads that are mutually parallel and form, with the circumferential direction XX' of the tire-type device, an angle $A_I$ substantially equal to 45°, and of a second family of threads that are mutually parallel, the respective threads of the two families of threads being symmetrical with respect to an equatorial plane XZ of the tire-type device.

In general, during its manufacture, a woven fabric is usually formed by interlacing a first family of threads that are mutually parallel, known as weft threads, and a second family of threads that are mutually parallel, known as warp threads, which are perpendicular to the weft threads. The mechanical characteristics of such a fabric, such as its tensile stiffness and its force at break under tension, in the direction of the weft or that of the warp, depend on the characteristics of the elementary threads, such as, for textile elementary threads, the count, expressed in tex or g/1000 m, tenacity, expressed in cN/tex, and standard contraction, expressed in %, these elementary threads being distributed at a given density, expressed in number of threads/dm. All of these characteristics depend on the material of which the threads are made and on the design of these threads.

A woven fabric as described above is, firstly, connected to the ends of the bearing elements as a constituent element of the sandwich structure. In the most general case, the sandwich structure thus comprises at least one woven fabric intended to be connected, generally by adhesive bonding or vulcanizing, either to the radially inner face of the radially outer structure of revolution, in order to become the radially outer woven fabric, or to the radially outer face of the radially inner structure of revolution, in order to become the radially inner woven fabric.

Irrespective of whether the woven fabric is intended to become the radially outer woven fabric or the radially inner woven fabric, it is laid on a cylindrical surface such that the mutually perpendicular warp and weft threads initially form, with the circumferential direction XX' of the tire-type device, an angle substantially equal to 45°.

After the sandwich structure has been fitted in the tire-type device, the tire-type device is shaped, i.e. the diameter of the radially outer structure of revolution increases while the diameter of the radially inner structure of revolution remains constant. If the woven fabric is radially on the outside, its radial distance from the axis of revolution of the tire-type device increases significantly during shaping, its circumferential length increases and the angle formed by the warp threads and weft threads with the circumferential direction XX' of the tire-type device, initially equal to 45°, decreases and becomes at least equal to 10° and at most equal to 45°, after shaping. If the woven fabric is radially on the inside, its radial distance from the axis of revolution of the tire-type device remains virtually constant during shaping, its circumferential length varies little if at all and the angle formed by the warp threads and weft threads with the circumferential direction XX' of the tire-type device, initially equal to 45°, remains substantially equal to 45°, after shaping.

According to a preferred variant of the preferred embodiment of the radially outer fabric, each bearing element comprises at least one radially inner end portion that is integrated with the radially outer woven fabric and made up of interlacings with respect to at least one thread of one of the two families of threads and parallel to the other family of threads.

According to a preferred variant of the preferred embodiment of the radially inner fabric, the bearing elements have at least one radially inner end portion that is integrated with the radially inner woven fabric and made up of interlacings with respect to at least one thread of one of the two families of threads and parallel to the other family of threads.

According to a preferred embodiment of the sandwich structure, the sandwich structure comprises a radially outer woven fabric and a radially inner woven fabric, and filamentary bearing elements made up of threads, the end portions of which are integrated into each radially outer and radially inner fabric, respectively, parallel to one of the families of threads of the fabric. Such a structure has the advantage of being able to be manufactured in a single weaving step. According to a particular variant, several filamentary bearing elements are made up of a continuous thread passing alternately through each radially outer and radially inner fabric, respectively.

As regards the nature of the materials, the bearing structure, the radially outer fabric and the radially inner fabric, which make up the sandwich structure, comprise a polymeric material, such as an aliphatic polyamide, an aromatic polyamide or a polyester, or a metal material, such as steel, or a glass- or carbon-type material or any combination of the above materials. Polymers, in particular elastomers, and metal, such as steel, are commonly used in the field of tires. Glass and carbon are alternative materials that are conceivable for use in tires.

In a first preferred material variant, the bearing structure, the radially outer fabric and the radially inner fabric, which make up the sandwich structure, comprise a polyester, such as a polyethylene terephthalate (PET). PET is commonly used in the field of tires on account of a good compromise between its mechanical properties, such as its resistance to breaking under tension, and its cost.

In a second material variant, the bearing structure, the radially outer fabric and the radially inner fabric, which make up the sandwich structure, comprise an aliphatic polyamide, such as a nylon. Nylon is also commonly used in the field of tires for the same reasons as PET.

Preferably, the sandwich structure, made up of the bearing structure, the radially outer fabric and the radially inner fabric, comprises a single material. A single material makes it possible not only to standardize the manufacture of the material but also to make it simpler to manufacture the sandwich structure.

In a first manner of laying the sandwich structure, the sandwich structure, made up of the bearing structure, the radially outer fabric and the radially inner fabric, is made up of a helical winding of a strip on the radially outer face of the radially inner fabric, so as to form a juxtaposition of contiguous or non-contiguous strip portions. The term "strip" is understood to mean a sandwich structure element having a limited axial width, at most equal to 0.3 times the axial width of the overall sandwich structure, and a great length, such that the strip to be laid can be stored in the form of a roll. Such a strip is thus unwound along a helix, having as its axis of revolution the axis of revolution of the tire-type device, on the radially inner structure of revolution, which acts as a laying form. The number of helical winding turns of the strip is determined by the axial width of the target sandwich structure and by the density of bearing elements that make up the strips. The laying of the strip can be contiguous, that is to say that the strip portions are in contact in pairs at their axial ends, or non-contiguous, that is to say that the axial ends of the strip portions are spaced apart by a predetermined distance. The advantage of strip laying is the lack of overlapping zones, or welds, in the circumferential direction, between strip portions at the end of winding. In a strip-type design, the connecting area $S_E$ of the radially outer fabric with the radially inner face of the radially outer structure of revolution is the total of the connecting areas of the juxtaposed strip elements.

In a second manner of laying the sandwich structure, the sandwich structure, made up of the bearing structure, the radially outer fabric and the radially inner fabric, is made up of a cylindrical winding, about the axis of revolution YY' of the tire-type device, of a single element having an axial width equal to the axial width of the sandwich structure. In this case, the sandwich structure is deposited in a single cylindrical winding turn on the radially inner structure of revolution, which acts as a laying form. The expression full-width laying is used, since the intended axial width of the sandwich structure is obtained in a single winding turn. The advantage of full-width laying is manufacturing productivity. On the other hand, it necessarily implies the existence of at least one overlapping zone, or weld, in the circumferential direction, between the circumferential ends of the sandwich structure, in particular at the end of winding.

Advantageously, the angle B formed by a bearing element with a radial direction ZZ' of the tire-type device is substantially zero for a bearing element situated in the equatorial plane XZ of the tire-type device, and is higher in absolute terms, the further a bearing element is from the equatorial plane XZ.

As regards the sidewalls, the sidewalls are advantageously not directly connected to the sandwich structure, and are preferably not directly connected to the bearing elements. They may or may not be involved in bearing the load, depending on their own structural stiffness. When they are involved in bearing the load, they have an independent mechanical behaviour and do not interfere with the mechanical behaviour of the bearing structure. However, the bearing elements positioned at the axial ends of the bearing structure may optionally be connected to or integrated with the sidewalls.

Since each sidewall has a curvilinear length $L_F$, the curvilinear length $L_F$ of each sidewall is advantageously at least equal to 1.05 times, preferably 1.15 times, the mean radial height H of the inner annular space. Even more advantageously, the curvilinear length $L_F$ of each sidewall is at least equal to 1.3 times and at most equal to 1.6 times the mean radial height H of the inner annular space. This sidewall length characteristic ensures that the deformation of the sidewall does not impair the meridian flattening of the tire-type device on account of excessively low curvature.

The circumferential reinforcement of the radially outer structure of revolution advantageously comprises at least one reinforcing layer comprising textile or metal reinforcing elements. In order to ensure transverse, or axial, stiffness of the tire device, the radially outer structure of revolution comprises a reinforcement comprising at least one reinforcing layer made up of filamentary reinforcing elements, most frequently metal or textile, coated with an elastomeric material. This reinforcement is most frequently radially inside a tread. The assembly made up of the reinforcement and the tread forms the radially outer shell of revolution.

The radially inner structure of revolution further advantageously comprises, on a radially inner face, a connecting layer intended to be fixed to the means for mounting on the vehicle. The connecting layer generally comprises at least one elastomeric material, but not necessarily a reinforcement. Fixing to the mounting means can be realized by the pressure forces that result from the inflation of the tire-type device.

According to one variant embodiment, the radially inner structure of revolution comprises, on a radially inner face, a connecting layer intended to be fixed to the means for mounting on the vehicle, by adhesive bonding. A bonded connection makes it possible in particular to avoid any rotation of the tire-type device with respect to the means for mounting on the vehicle.

A further aspect of the invention is directed to a mounted assembly comprising a tire device according to one of the above-described embodiments, mounted on a means for mounting on the vehicle.

The tire-type device of the invention can be manufactured, for example, by the method described below. In a first step, the sandwich structure, made up of the bearing structure made up of filamentary elements that connect two fabrics that are intended to be fixed to the radially inner structure of revolution and to the radially outer structure of revolution, respectively, can be manufactured by any known method for manufacturing a sandwich-type composite structure, in particular by weaving. Once the sandwich structure has been produced, the tire-type device can be manufactured in accordance with the following method steps:

wrapping the radially inner structure of revolution over a drum, the diameter of which is equal to that of the mounting means, onto which the tire-type device is intended to be mounted, wrapping the sandwich structure over the radially inner structure of revolution, placing the sidewalls at the axial ends of the sandwich structure so as to form a closed cavity, pressurizing said closed cavity in order to deploy the sandwich structure, wrapping the radially outer structure of revolution over the sandwich structure, depressurizing the closed cavity down to ambient atmospheric pressure, curing the device.

The mounted assembly according to the invention can be produced by fixing the tire-type device to a mounting means, such as a rim. This fixing can be carried out, for example, by bonding the radially inner face of the radially inner structure of revolution to the radially outer face of the mounting means.

BRIEF DESCRIPTION OF THE DRAWINGS

The present invention will be better understood with the aid of FIGS. 1 to 6 presented below.

DETAILED DESCRIPTION OF THE DRAWINGS

Figure 1:
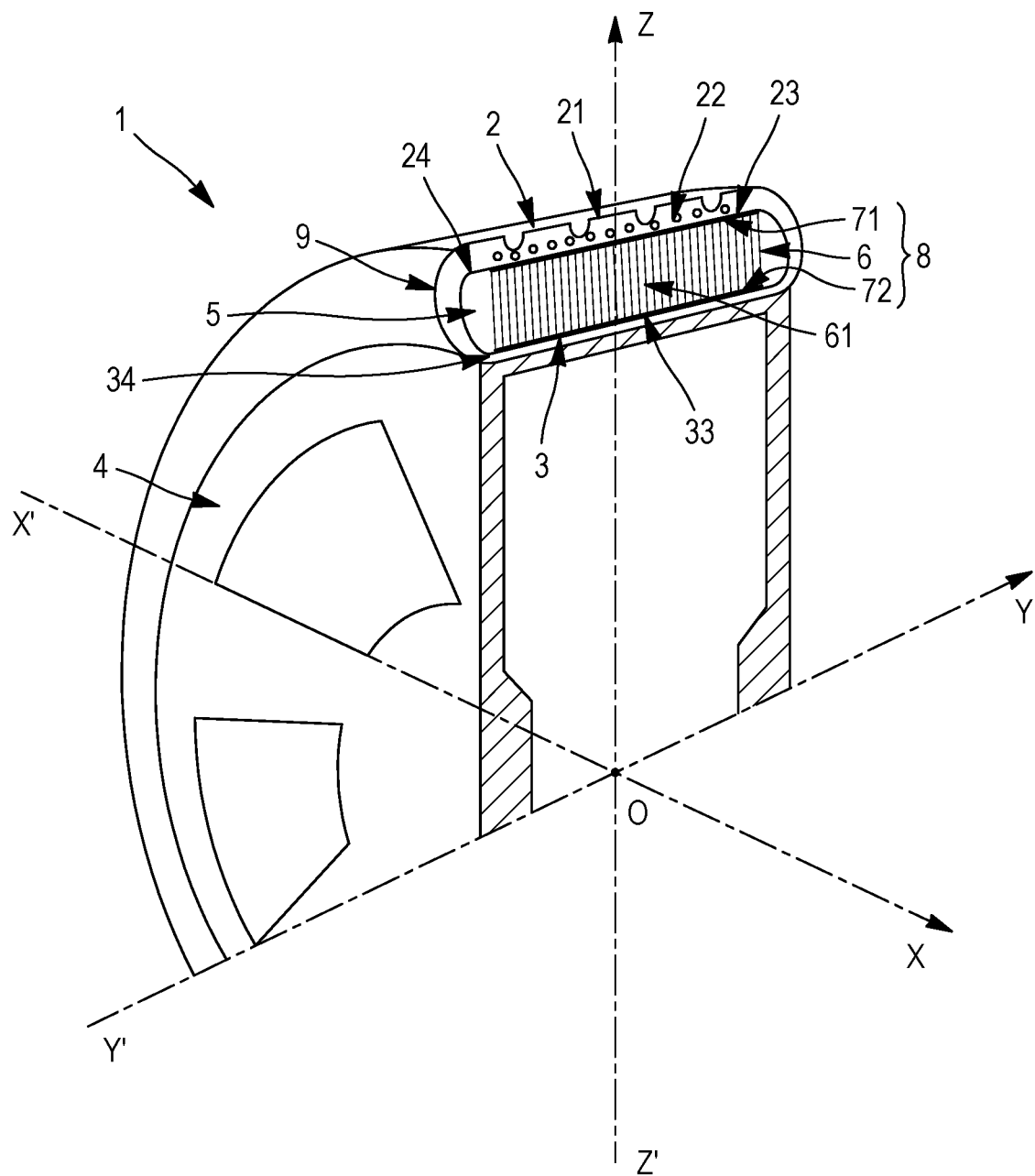
FIG. 1: perspective view in partial section of a tire-type device according to an embodiment of the invention.

FIG. 1 shows a perspective view in partial section of a tire-type device 1 according to the invention, mounted on a mounting means 4 or rim, and comprising a radially outer structure of revolution 2 having a radially inner face 23 and two axial ends 24, a radially inner structure of revolution 3 having a radially outer face 33 and two axial ends 34, an inner annular space 5, a sandwich structure 8 comprising a bearing structure 6, a radially outer fabric 71 and a radially inner fabric 72, and two sidewalls 9. The radially outer structure of revolution 2 has an axis of revolution which is the axis of rotation YY' of the tire-type device and is intended to come into contact with the ground via a tread 21 comprising at least one elastomeric material. Moreover, the radially outer structure of revolution 2 comprises a circumferential reinforcement 22 which, in the present case, is made up of a single reinforcing layer. The radially inner structure of revolution 3, which is coaxial with the radially outer structure of revolution 2, is intended to ensure the connection of the tire-type device 1 with the mounting means 4. The radially inner structure of revolution 3 comprises at least one polymeric material, most frequently an elastomer compound. The inner annular space 5 is radially delimited by the radially outer 2 and radially inner 3 structures of revolution, respectively. According to the invention, the bearing structure 6 is made up of a plurality of bearing elements 61 that extend continuously from the radially inner face 23 of the radially outer structure of revolution 2 to the radially outer face 33 of the radially inner structure of revolution 3 and are independent in pairs in the inner annular space 5. The radially outer fabric 71 and radially inner fabric 72 of the sandwich structure 8 are connected, and usually bonded, to the radially inner face 23 of the radially outer structure of revolution 2 and to the radially outer face 33 of the radially inner structure of revolution 3, respectively. Finally, the tire-type device 1 comprises two sidewalls 9 that connect the axial ends (24, 34) of the radially outer 2 and radially inner 3 structures of revolution, respectively, and axially delimit the inner annular space 5, such that the inner annular space 5 forms a closed cavity that can be pressurized by an inflation gas.

Figure 2:
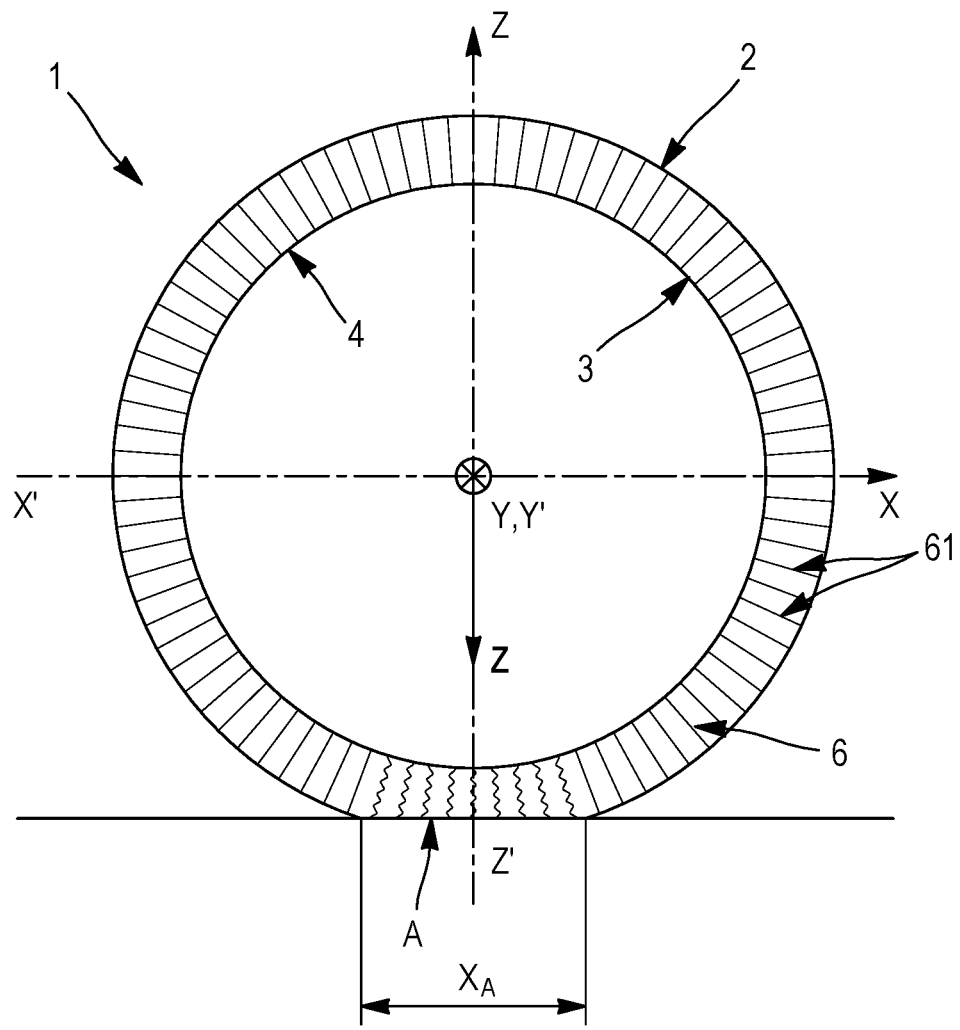
FIG. 2: view in circumferential section of a tire-type device according to an embodiment of the invention, in the squashed state.

FIG. 2 shows a circumferential section of a tire-type device 1 according to the invention, mounted on a mounting means 4, in its squashed state, that is to say subjected to a nominal radial load Z. The bearing structure 6 is made up of a plurality of filamentary bearing elements 61 that extend continuously from the radially outer structure of revolution 2 to the radially inner structure of revolution 3 and are independent in pairs in the inner annular space 5. The tire-type device 1, subjected to a nominal radial load Z, is in contact with flat ground by way of an area of contact A, having a circumferential length $X_A$. The bearing elements which are connected to that portion of the radially outer structure of revolution 2 that is in contact with the ground are made to buckle under compression, while at least some of the bearing elements that are connected to that portion of the radially outer structure of revolution 2 that is not in contact with the ground are under tension.

Figure 3A:
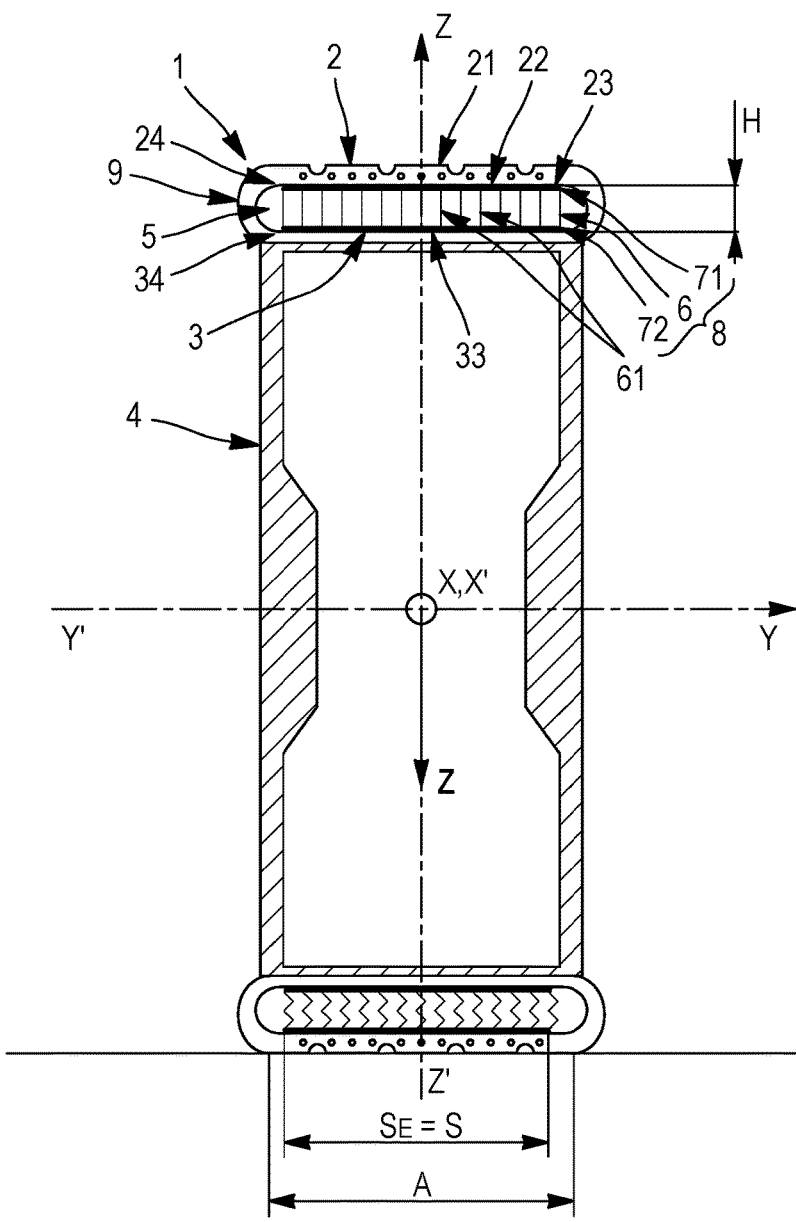
FIG. 3A: view in meridian section of a tire-type device according to an embodiment of the invention, in the case of a bearing structure having one-dimensional bearing elements.

FIG. 3A shows a meridian section of a tire-type device 1 according to the invention, mounted on a mounting means 4. As described for FIG. 1, the tire-type device 1 comprises a radially outer structure of revolution 2 having a radially inner face 23 and two axial ends 24 and comprising a tread 21 and a reinforcement 22, a radially inner structure of revolution 3 having a radially outer face 33 and two axial ends 34, an inner annular space 5, a sandwich structure 8 comprising a bearing structure 6 having filamentary bearing elements 61, a radially outer fabric 71 and a radially inner fabric 72, and two sidewalls 9. The tire-type device 1, subjected to a nominal radial load Z, is in contact with flat ground by way of an area of contact A. As seen above, the bearing elements 61 that are positioned on the opposite side from the contact patch are under tension, while the bearing elements 61 that are connected to that portion of the radially outer structure of revolution 2 in contact with the ground are made to buckle under compression.

Figure 3B:
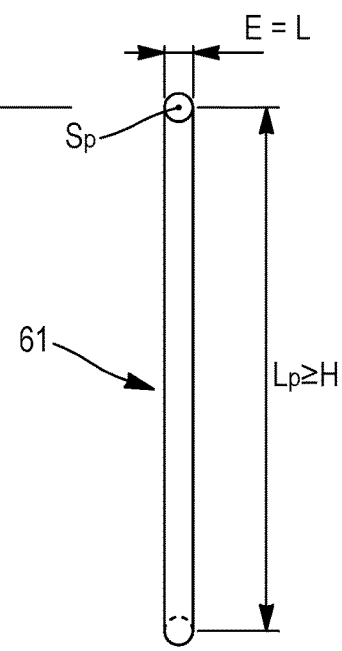
FIG. 3B: perspective view of a one-dimensional bearing element.

FIG. 3B shows a filamentary or one-dimensional bearing element 61 having a circular mean section $S_P$ that is defined by a smallest characteristic dimension E and a largest characteristic dimension L that are both equal, in the example shown, to the diameter of the circle, and is characterized by its aspect ratio K equal to L/E, and thus equal to 1 in the present case. Moreover, the smallest characteristic dimension E of the mean section $S_P$ of the bearing element 61, that is to say, in the present case, its diameter, is at most equal to 0.02 times the mean radial height H of the inner annular space 5. The bearing element 61 has a length $L_P$ at least equal to the mean height H of the inner annular space 5.

Figure 4:
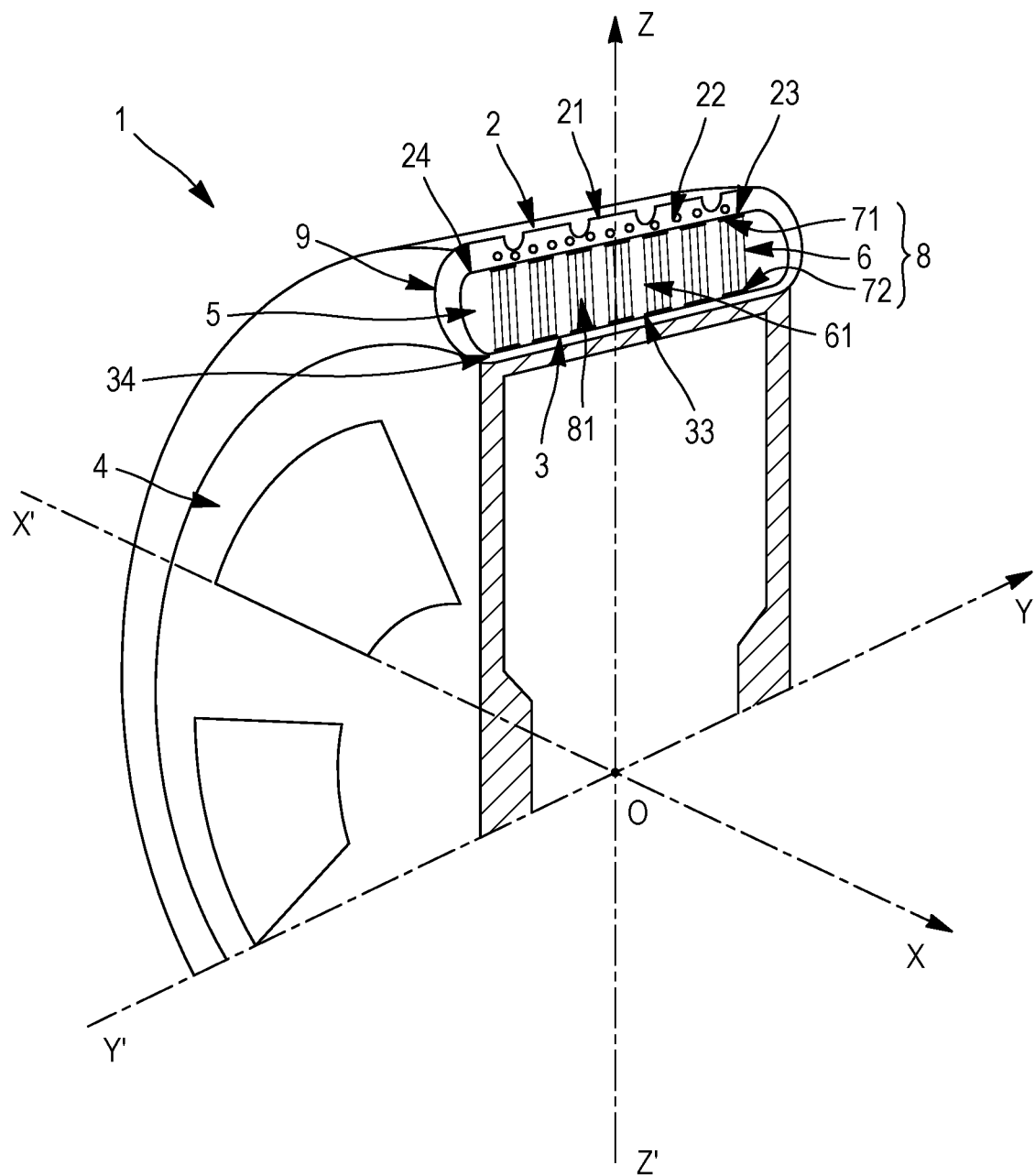
FIG. 4: perspective view in partial section of a tire-type device according to a preferred embodiment of the invention, with a sandwich structure formed by helical winding of a strip.

FIG. 4 shows a perspective view in partial section of a tire-type device 1 according to a preferred embodiment of the invention in which the sandwich structure 8, made up of the bearing structure 6, the radially outer fabric 71 and the radially inner fabric 72, is made up of a helical winding of a strip 81 on the radially outer face 33 of the radially inner structure of revolution 3, so as to form a juxtaposition of strip portions. The other elements referenced in FIG. 4 are identical to those in FIG. 1.

Figure 5:
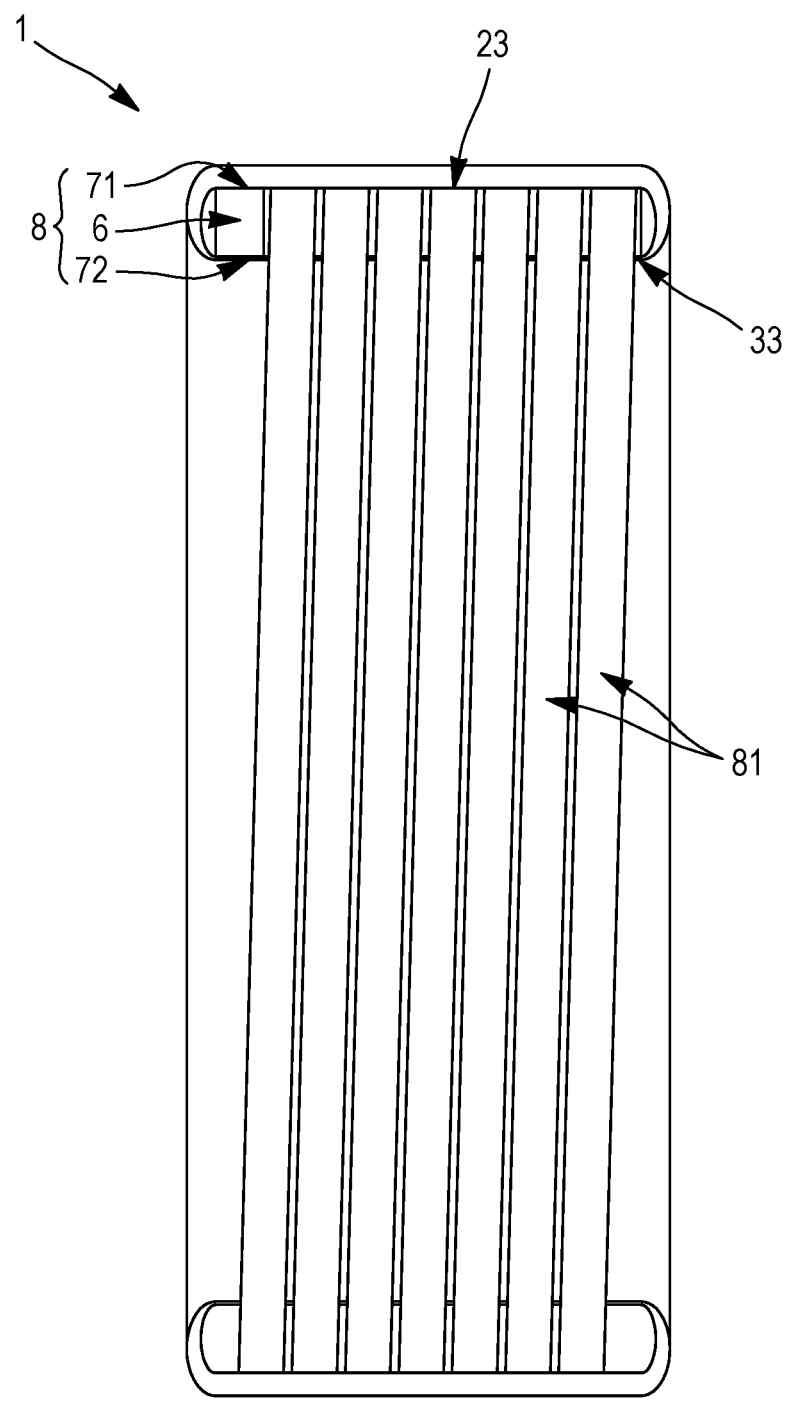
FIG. 5: front view with partial section of the tread of a tire-type device according to a preferred embodiment of the invention, with a sandwich structure formed by helical winding of a strip.

FIG. 5 shows a front view with partial section of the tread of a tire-type device 1 according to the preferred embodiment of the invention, shown in perspective with partial section in FIG. 4. FIG. 5 is a view with partial removal of the tread 2, revealing the helical winding of a strip 81 on the radially outer face 33 of the radially inner structure of revolution 3 so as to form a juxtaposition of strip portions. This helical winding of a strip 81 forms the sandwich structure 8, made up of the bearing structure 6, the radially outer fabric 71 and the radially inner fabric 72.

Figure 6A:
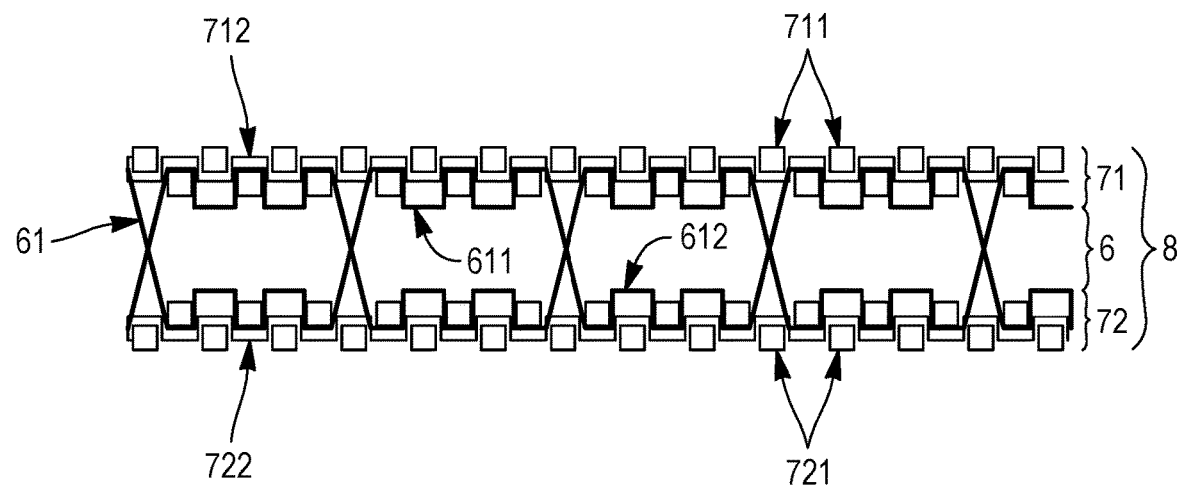
FIG. 6A: view in meridian section of a sandwich structure comprising two woven fabrics and a bearing structure.

FIG. 6A is a view in meridian section of a sandwich structure 8 comprising two woven fabrics (71, 72) and a bearing structure 6. The two woven fabrics (71, 72) are intended to become the radially outer fabric and radially inner fabric, respectively, following integration into the tire-type device. Each woven fabric (71, 72) consists of perpendicular interlacings of a first family of threads (711, 721), known as weft threads, and a second family of threads (712, 722), known as warp threads. Moreover, the bearing elements 61 of the bearing structure 6 are made up of continuous threads connecting the two woven fabrics (71, 72) and comprising portions (611, 612) which are interlaced with the respective weft threads (711, 721) of said woven fabrics (71, 72), are parallel to the warp threads (712, 722) and form the ends of the bearing elements 61 integrated into each fabric. The advantage of such a design is that it is possible to weave the sandwich structure in one step.

Figure 6B:
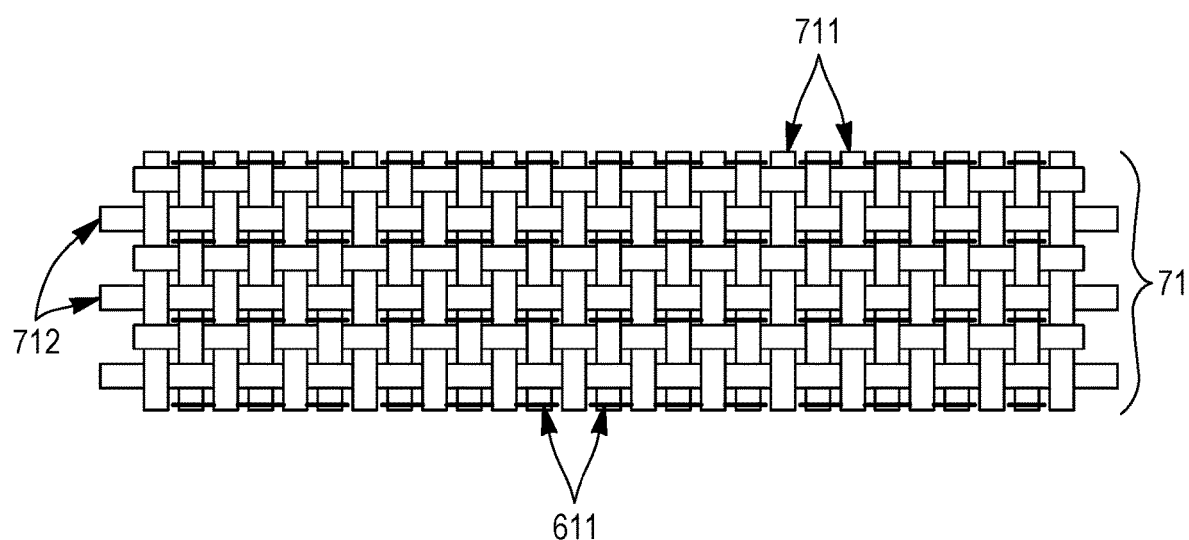
FIG. 6B: top view of a sandwich structure comprising two woven fabrics and a bearing structure.

FIG. 6B shows a top view of a sandwich structure 8 comprising two woven fabrics (71, 72) and a bearing structure 6. The woven fabric 71 shown consists of perpendicular interlacings of the first family of threads 711, known as weft threads, and the second family of threads 712, known as warp threads. Moreover, FIG. 6B shows portions of threads 611 which are interlaced with the weft threads 711, are parallel to the warp threads 712 and form ends of the bearing elements 61 integrated into the woven fabric 71.

Figure 7:
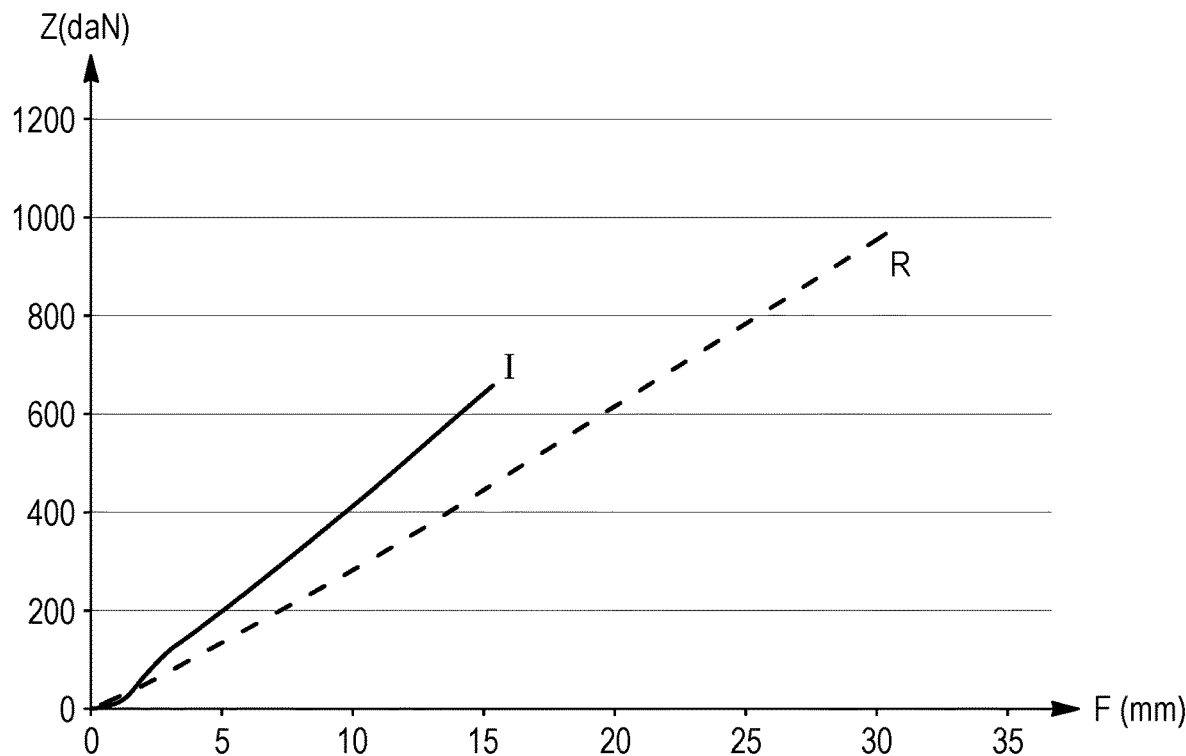
FIG. 7: compared typical curves of the change in load applied as a function of deflection for a tire-type device according to an embodiment of the invention and a reference tire of the prior art.

FIG. 7 shows two compared typical curves of the change in load applied Z, expressed in daN, as a function of deflection F, expressed in mm, for a tire-type device according to the invention I and a reference tire R of the prior art. This figure shows that, for a given radial load Z, the deflection F of a tire-type device according to the invention I is less than that of the reference tire R. In other words, the radial stiffness of the tire-type device I is greater than the radial stiffness of the reference tire R.

Figure 8:
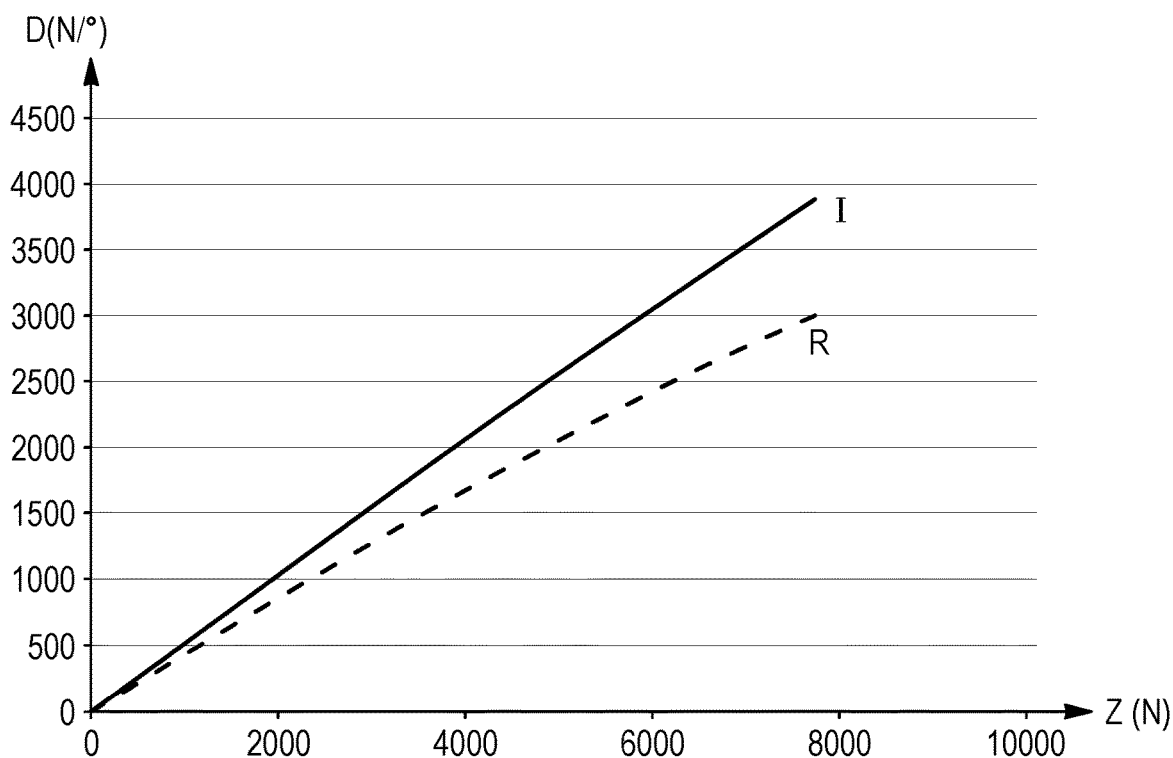
FIG. 8: compared typical curves of the change in cornering stiffness as a function of load applied for a tire-type device according to an embodiment of the invention and a reference tire of the prior art.

FIG. 8 shows two compared typical curves of the change in cornering stiffness, expressed in N/°, as a function of the load applied, expressed in N, for a tire-type device according to the invention and a reference tire of the prior art. This figure shows that, for a given radial load Z, the cornering stiffness Z of a tire-type device according to the invention I is greater than that of the reference tire R.

The invention has been studied more particularly as an alternative solution to a conventional tire for a passenger vehicle.

The tire-type device studied, the stiffness characteristics of which are shown in FIGS. 5 and 6 described above, comprises a radially outer structure of revolution and a radially inner structure of revolution having respective mean radii equal to 333 mm and 289 mm, and axial widths that are both equal to 250 mm. The inner annular space, radially delimited by the radially outer and radially inner structures of revolution, respectively, has a mean radial height H equal to 35 mm. The sandwich structure made up of the bearing structure, the radially outer fabric and the radially inner fabric is made of polyethylene terephthalate (PET). Each filamentary bearing element of the bearing structure, made of polyethylene terephthalate (PET), has a mean section $S_P$ equal to $7*10^{-8}$ $m^2$ and a stress at break $F_r/S_P$ equal to 470 MPa. The surface density D of the bearing elements per unit area of radially outer structure of revolution is equal to 85 000 threads/$m^2$. The tire-type structure, inflated to a pressure P of between 1.5 bar and 2.5 bar, is subjected to a radial load Z equal to 600 daN.

Although the invention describes a bearing structure made up of filamentary bearing elements that are identical in terms of aspect ratio K, structure and material, the invention can be extended to a bearing structure which may be made up of any combination of bearing elements, such as, for example:

- filamentary bearing elements having different aspect ratios K and/or structures and/or materials,
- filamentary bearing elements distributed in a non-uniform density in the axial direction and/or in the circumferential direction, this list not being exhaustive.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire device for a vehicle, comprising:
   a radially outer structure of revolution, an axis of revolution of which is an axis of rotation of the tire device and which is adapted to come into contact with the ground via a tread comprising at least one elastomeric material, the radially outer structure of revolution having two axial ends and a radially inner face having an area S, and the radially outer structure of revolution comprising a circumferential reinforcement;
   a radially inner structure of revolution that is coaxial with the radially outer structure of revolution and is configured to ensure a connection of the tire device with a means for mounting on the vehicle, the radially inner structure of revolution having two axial ends and a radially outer face, and the radially inner structure of revolution comprising at least one polymeric material;
   an inner annular space of mean radial height H that is radially delimited by the radially inner face of the radially outer structure of revolution and by the radially outer face of the radially inner structure of revolution;
   a bearing structure comprises a plurality of identical bearing elements that are not mechanically connected together in the inner annular space, the bearing elements extending continuously from the radially inner face of the radially outer structure of revolution to the radially outer face of the radially inner structure of revolution, such that, when the tire device is subjected to a nominal radial load Z and is in contact with flat ground via an area of contact A, the bearing elements that are connected to a portion of the radially outer structure of revolution that is in contact with the ground are made to buckle under compression and at least some of the bearing elements that are connected to a portion of the radially outer structure of revolution that is not in contact with the ground are under tension,
   wherein the bearing elements of the bearing structure are filamentary, wherein the bearing elements of the bearing structure are connected to the radially inner face of the radially outer structure of revolution by a radially outer fabric, at least partially covering said radially inner face over a connecting area $S_E$, and are connected to the radially outer face of the radially inner structure of revolution by a radially inner fabric, at least partially covering said radially outer face, an assembly made up of the bearing structure, the radially outer fabric, and the radially inner fabric being a sandwich structure,
   wherein the mean surface density D of the bearing elements per unit area of radially outer structure of revolution, expressed in $1/m^2$, is at least equal to $(S/S_E)*Z/(A*Fr)$,
   where:
   S is the area, in $m^2$, of the radially inner face of the radially outer structure of revolution,
   $S_E$ is the connecting area, in $m^2$, of the radially outer fabric with the radially inner face of the radially outer structure of revolution,
   Z is the nominal radial load, in N, applied to the tire device,
   A is the area of contact with the ground, in $m^2$, of the tire device, and
   Fr is the force at break, in N, of a bearing element of the plurality of identical bearing elements, and
   wherein the tire device comprises two sidewalls that connect, in pairs, the axial ends of the radially outer and radially inner structures of revolution, respectively, and axially delimit the inner annular space, such that the inner annular space forms a closed cavity that can be pressurized by an inflation gas.

2. The tire device according to claim 1, wherein the surface density D of the bearing elements per unit area of radially outer structure of revolution, expressed in $1/m^2$, is at least equal to $3*(S/S_E)*Z/(A*Fr)$.

3. The tire device according to claim 1, wherein the surface density D of the bearing elements per unit area of radially outer structure of revolution, expressed in $1/m^2$, is at least equal to $6*(S/S_E)*Z/(A*Fr)$.

4. The tire device according to claim 1, wherein the connecting area $S_E$, in $m^2$, of the radially outer fabric with the radially inner face of the radially outer structure of revolution is equal to the area S of the radially inner face of the radially outer structure of revolution.

5. The tire device according to claim 1, wherein the radially outer fabric is a woven fabric comprising interlacings of a first family of threads that are mutually parallel and form, with a circumferential direction of the tire device, an angle AE at least equal to 100 and at most equal to 450, and of a second family of threads that are mutually parallel, the respective threads of the first and second families of threads being symmetrical with respect to an equatorial plane of the tire device.

6. The tire device according to claim 5, wherein each said bearing element comprises at least one radially outer end portion that is integrated with the radially outer woven fabric and comprised of interlacings with respect to at least one thread of one of the first and second families of threads and parallel to the other family of threads.

7. The tire device according to claim 1, wherein the radially inner fabric is a woven fabric comprising interlacings of a first family of threads that are mutually parallel and form, with the circumferential direction of the tire device, an angle $A_1$ substantially equal to 450, and of a second family of threads that are mutually parallel, the respective threads of the first and second families of threads being symmetrical with respect to an equatorial plane of the tire device.

8. The tire device according to claim 7, wherein the bearing elements have at least one radially inner end portion that is integrated with the radially inner woven fabric and comprised of interlacings with respect to at least one thread of one of the first and second families of threads and parallel to the other family of threads.

9. The tire device according to claim 7, wherein the sandwich structure comprises the radially outer woven fabric and the radially inner woven fabric and the identical bearing elements configured as filamentary bearing elements comprised of threads, respective end portions of which are integrated into each radially outer and radially inner fabric parallel to one of the families of threads of the fabric.

10. The tire device according to claim 1, wherein at least one of the bearing structure, the radially outer fabric, and the radially inner fabric, which comprise the sandwich structure, comprise a polymeric material, wherein the polymeric material is an aliphatic polyamide, an aromatic polyamide, a polyester, a metal material, steel, a material comprising glass or carbon, or any combination of the above materials.

11. The tire device according to claim 1, wherein at least one of the bearing structure, the radially outer fabric, and the radially inner fabric, which comprise the sandwich structure, comprise a polyester.

12. The tire device according to claim 1, wherein at least one of the bearing structure, the radially outer fabric, and the radially inner fabric, which comprise the sandwich structure, comprise an aliphatic polyamide.

13. The tire device according to claim 1, wherein the sandwich structure, comprised of the bearing structure, the radially outer fabric, and the radially inner fabric, comprises a same material.

14. The tire device according to claim 1, wherein the sandwich structure, comprised of the bearing structure, the radially outer fabric, and the radially inner fabric, is comprised of a helical winding of a strip on the radially outer face of the radially inner structure of revolution, so as to form a juxtaposition of contiguous or non-contiguous strip portions.

15. The tire device according to claim 1, wherein the sandwich structure, comprised of the bearing structure, the radially outer fabric, and the radially inner fabric, is comprised of a cylindrical winding, about the axis of revolution of the tire device, of a single element having an axial width equal to the axial width of the sandwich structure.

16. The tire device according to claim 1, wherein an angle B formed between a said bearing element with a radial direction of the tire device is substantially zero for a bearing element situated in the equatorial plane of the tire device, and is higher in absolute terms, the further a said bearing element is from the equatorial plane.

17. The tire device according to claim 1, wherein the sidewalls are not directly connected to the sandwich structure.

18. The tire device according to claim 1, wherein the circumferential reinforcement of the radially outer structure of revolution comprises at least one reinforcing layer comprising textile or metal reinforcing elements.

19. The tire device according to claim 1, wherein the radially inner structure of revolution comprises, on a radially inner face, a connecting layer configured to be fixed to the means for mounting on the vehicle.

20. A mounted assembly comprising a tire device according to claim 1 mounted on a means for mounting on the vehicle.

* * * * *